United States Patent
Yoshino et al.

(10) Patent No.: US 11,824,299 B2
(45) Date of Patent: Nov. 21, 2023

(54) CONNECTOR

(71) Applicant: Sony Semiconductor Solutions Corporation, Kanagawa (JP)

(72) Inventors: Yoshitaka Yoshino, Kanagawa (JP); Toshiyuki Sudo, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 72 days.

(21) Appl. No.: 17/279,831

(22) PCT Filed: Sep. 25, 2019

(86) PCT No.: PCT/JP2019/037506
§ 371 (c)(1),
(2) Date: Mar. 25, 2021

(87) PCT Pub. No.: WO2020/071197
PCT Pub. Date: Apr. 9, 2020

(65) Prior Publication Data
US 2021/0399460 A1    Dec. 23, 2021

(30) Foreign Application Priority Data
Oct. 1, 2018  (JP) ................. 2018-186426

(51) Int. Cl.
*H01R 13/50*   (2006.01)
*H01R 24/40*   (2011.01)
(Continued)

(52) U.S. Cl.
CPC ............ *H01R 13/50* (2013.01); *H01R 24/40* (2013.01); *H01R 24/60* (2013.01); *H01R 13/646* (2013.01);
(Continued)

(58) Field of Classification Search
CPC ...... H01R 13/562; H01R 43/24; H01R 13/50; H01R 13/646; H01R 24/40; H01R 24/60; H01R 2103/00; H01R 2107/00
(Continued)

(56) References Cited

U.S. PATENT DOCUMENTS

| 8,449,328 B2 * | 5/2013 | Ooki ................... H01R 13/504 525/70 |
| 2012/0329323 A1 | 12/2012 | Fink et al. |

(Continued)

FOREIGN PATENT DOCUMENTS

| JP | H08-022867 A | 1/1996 |
| JP | H11-307186 A | 11/1999 |

(Continued)

OTHER PUBLICATIONS

International Search Report issued in International Patent Application No. PCT/JP2019/037506 dated Nov. 26, 2019 and English translation of same. 5 pages.

(Continued)

*Primary Examiner* — Gary F Paumen
(74) *Attorney, Agent, or Firm* — K&L Gates L.L.P

(57) ABSTRACT

A connector includes a cable including at least one core wire and a shielding wire arranged around the core wire with an insulating member interposed therebetween, a plug part connected to the cable and capable of fitting with a receptacle, a primary molded part including a connection portion between the core wire and a conductive member of the plug part, and a secondary molded part arranged at a lead-out portion of the cable. The dimension of the primary molded part is an outer diameter or a thickness of the plug part.

19 Claims, 4 Drawing Sheets

(51) Int. Cl.
    *H01R 24/60* (2011.01)
    *H01R 13/646* (2011.01)
    *H01R 103/00* (2006.01)
    *H01R 107/00* (2006.01)

(52) U.S. Cl.
    CPC ...... *H01R 2103/00* (2013.01); *H01R 2107/00* (2013.01)

(58) Field of Classification Search
    USPC ........................................ 439/604, 606, 447
    See application file for complete search history.

(56) References Cited

U.S. PATENT DOCUMENTS

2016/0126660 A1* 5/2016 Henry ................ H01R 13/5845
                                                      439/701
2016/0141818 A1   5/2016 Xing et al.

FOREIGN PATENT DOCUMENTS

| JP | 2017-091670 A  | 5/2017 |
| JP | 2017-208286 A  | 11/2017 |
| WO | WO2011019027 A1 | 2/2011 |
| WO | WO2017/122236 A1 | 7/2017 |

OTHER PUBLICATIONS

Written Opinion issued in International Patent Application No. PCT/JP2019/037506 dated Nov. 26, 2019. 5 pages.

* cited by examiner

CONNECTOR

TECHNICAL FIELD

The present technology relates to a connector that can be applied, for example, to a coaxial connector.

BACKGROUND ART

A coaxial connector has a connector part to which one end of a wire material of a coaxial cable is connected and is used for transmission of television signals and so forth. In a case where the connector part and the wire material are connected to each other, the coaxial cable is produced by carrying out primary molding (for example, PP (polypropylene)) for protecting a connection portion between the wire material and the connector and secondary molding (elastomer, polyvinylchloride, or the like) for protecting a holding portion such that a person can hold the coaxial cable at the holding portion to use the coaxial cable. For example, PTL 1 discloses a coaxial connector with enhanced waterproof property. In PTL 1, after a connection portion of a wire material is sealed with a hot melt, the whole part is molded by over-molding.

CITATION LIST

Patent Literature

[PTL 1]
Japanese Patent Laid-Open No. 2017-208286

SUMMARY

Technical Problem

The conventional coaxial connector has a problem in that, since the same portion is covered with a double resin by primary molding and secondary molding, the connector portion has an increased outer shape. The connector portion being large in size signifies that, in a configuration in which plural coaxial connectors are inserted side by side, a distance (pitch) between receptacles on a product side cannot be made small. Accordingly, effective utilization of a board area of the product is obstructed.

Accordingly, an object of the present technology resides in provision of a connector in which a connector portion can be made to have a reduced size.

Solution to Problem

The present technology is a connector including a cable including at least one core wire and a shielding wire arranged around the core wire with an insulating member interposed therebetween, a plug part connected to the cable and capable of fitting with a receptacle, a primary molded part including a connection portion between the core wire and a conductive member of the plug part, and a secondary molded part arranged at a lead-out portion of the cable. A dimension of the primary molded part is an outer diameter or a thickness of the plug part.

Advantageous Effects of Invention

According to at least one embodiment, the present technology makes it possible to effectively utilize a board area of a product by reduction in pitch of adjacent connectors and makes it possible to reduce an amount of a used resin by reduction in size. It is to be noted that the advantageous effects described here are not necessarily restrictive, and any advantageous effects described in the present technology may be applicable.

DESCRIPTION OF EMBODIMENTS

Embodiments described below are preferred particular examples of the present technology and have various restrictions attached thereto in a technically preferable manner. However, the scope of the present technology shall not be restricted to the embodiments unless it is specified in the following description that the present technology is restricted specifically.

Figure 1A:
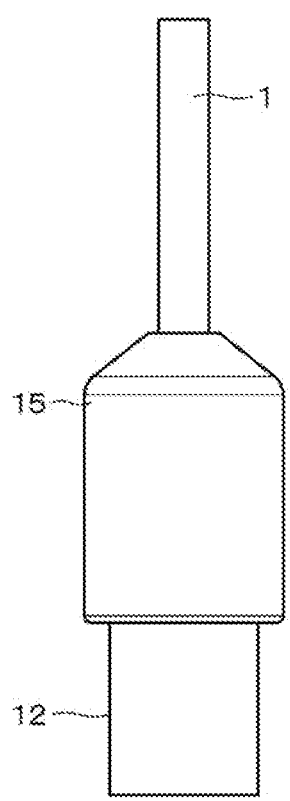
FIGS. 1A and 1B are a plan view and a sectional view, respectively, of a conventional coaxial connector after primary molding.
Figure 1B:
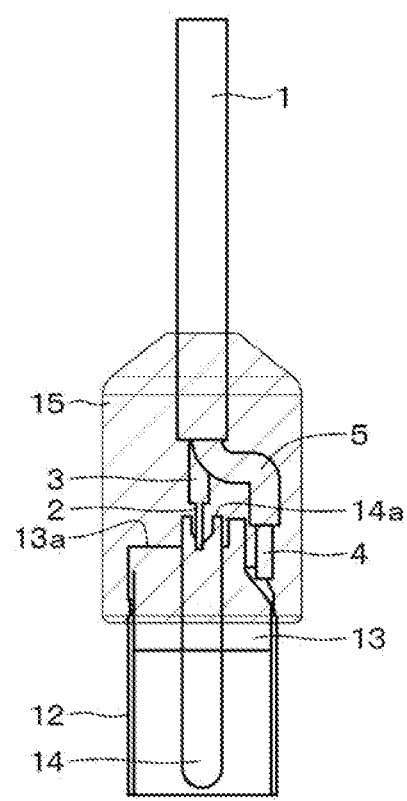
Figure 1C:
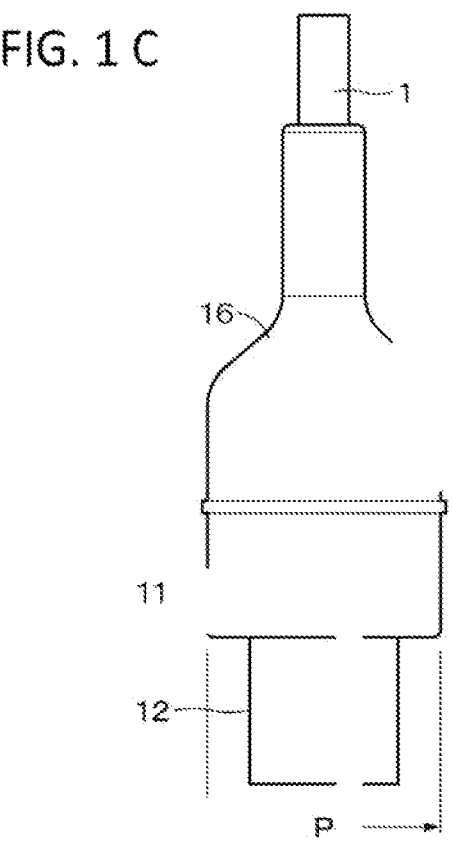
FIGS. 1C and 1D are a plan view and a sectional view, respectively, of the conventional coaxial connector after secondary molding.
Figure 1D:
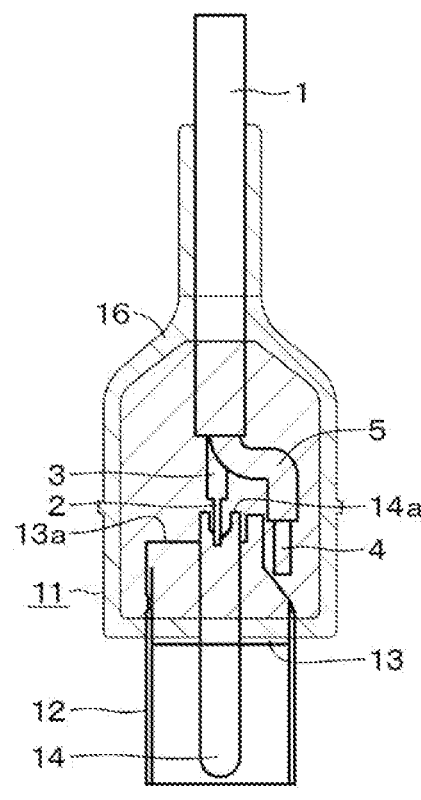

An example of a conventional coaxial connector, for example, a coaxial connector of the IEC (International Electrotechnical Commission) standard, is described with reference to FIGS. 1A, 1B, 1C, and 1D. FIGS. 1A and 1B are a plan view and a sectional view, respectively, of the conventional coaxial connector after primary molding, and FIGS. 1C and 1D are a plan view and a sectional view, respectively, of the conventional coaxial connector after secondary molding.

A coaxial cable 1 includes a core wire 2, an insulating material 3 that covers a circumference of the core wire 2, a shielding wire 4 that covers the insulating material 3, and an outer sheath 5 that covers the shielding wire 4. The coaxial cable 1 is connected to a plug part 11.

The plug part 11 is capable of fitting with a receptacle. In particular, the plug part 11 includes a cylindrical receiving portion 12 having a receiving space into which the receptacle is to be inserted, an insulating holder 13 attached in the cylindrical receiving portion 12, and a central conductor 14 as a conductive material press-fitted in the insulating holder 13 so as to be positioned at a center of the cylindrical receiving portion 12. An end portion 14a of the central conductor 14 extending through the insulating holder 13 projects to a rear face (referred to as a connector end face) 13a of the insulating holder 13.

The core wire 2 of the coaxial cable 1 is crimped (caulked) or soldered to the end portion 14a of the central conductor 14. The central conductor 14 includes a metallic material having conductivity such as copper processed by gold plating. Further, the shielding wire 4 of the coaxial cable 1 extends from the connector end face 13a side of the insulating holder 13 toward the cylindrical receiving portion 12 and is soldered to a conductive member arranged on an inner side of the cylindrical receiving portion 12.

In the conventional coaxial connector described above, a primary molded part 15 is obtained by carrying out primary molding with a resin, for example, PP (polypropylene), so as to include a connection portion between the end portion 14a of the central conductor 14 and the core wire 2 of the coaxial cable (refer to FIGS. 1A and 1B). Then, molding with elastomer or polyvinylchloride is carried out so as to cover the entire primary molded part 15, to thereby manufacture the coaxial connector (refer to FIGS. 1C and 1D). Since molding is carried out twice in this manner, a secondary molded part 16 overlaps an overall surface of the primary molded part 15, so that the cylindrical plug part 11 has an outer diameter P of approximately 15.6+/−0.5 mm.

Figure 2A:
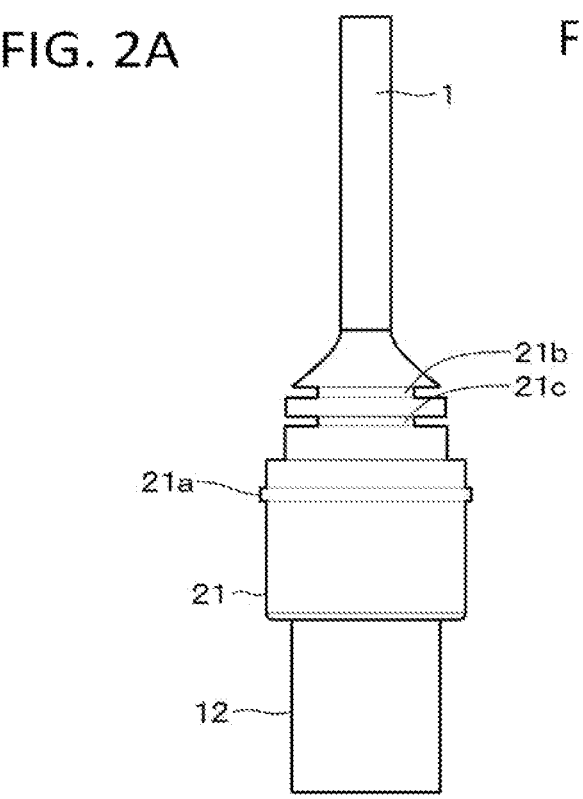
FIGS. 2A and 2B are a plan view and a sectional view, respectively, of a coaxial connector according to an embodiment of the present technology after primary molding.
Figure 2B:
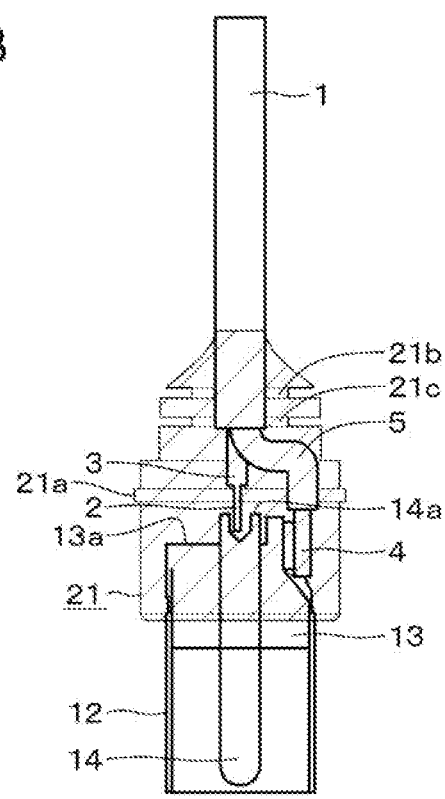
Figure 2C:
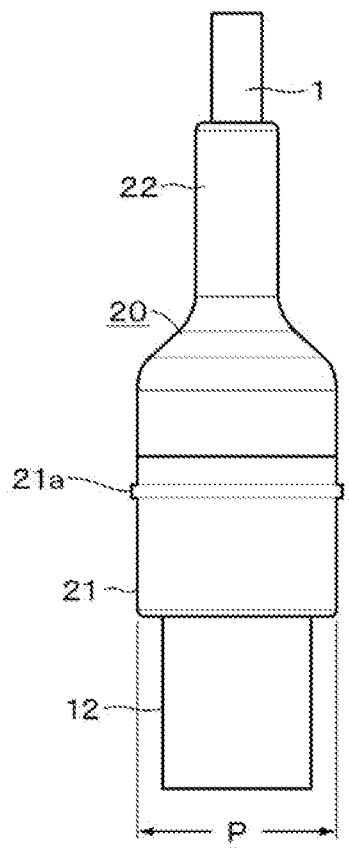
FIGS. 2C and 2D are a plan view and a sectional view, respectively, of the coaxial connector according to the embodiment of the present technology after secondary molding.
Figure 2D:
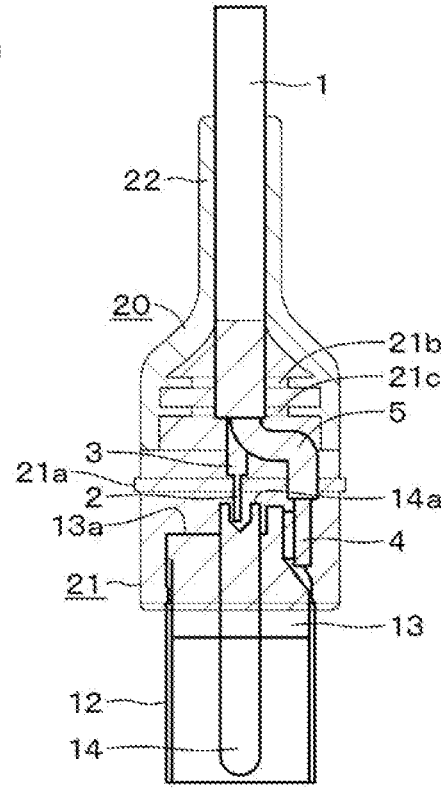

An embodiment of the present technology is described with reference to FIGS. 2A, 2B, 2C, and 2D. FIGS. 2A and 2B are a plan view and a sectional view, respectively, of a coaxial connector according to the embodiment of the present technology after primary molding, and FIGS. 2C and 2D are a plan view and a sectional view, respectively, of the coaxial connector according to the embodiment of the present technology after secondary molding. The embodiment is an example of a coaxial connector of the IEC standard and accordingly has a configuration similar to that of the conventional coaxial connector described above. A core wire 2 of a coaxial cable 1 is crimped (caulked) or soldered to an end portion 14a of a central conductor 14 as a conductive material of a plug part 11. A shielding wire 4 of the coaxial cable 1 is extended to a front face side from a connector end face 13a of an insulating holder 14 and is soldered at an extension end thereof to a conductive member arranged on an inner face of a cylindrical receiving portion 12.

Primary molding is carried out, for example, with PP (polypropylene) so as to cover a connection portion between the coaxial cable 1 and a conductive member of a plug part 20, namely, a connection portion between the core wire 2 and the end portion 14a of the central conductor 14 and a connection portion between the shielding wire 4 and the conductive member arranged on the inner face of the cylindrical receiving portion 12, to thereby obtain a primary molded part 21 (refer to FIGS. 2A and 2B). PP has a surface hardness of R80 to R110. A dimension of the primary molded part 21 defines a dimension of an outer shape of the plug part 20. On an outer surface of the primary molded part 21, a ring-like protrusion 21a is formed over a circumference thereof. The protrusion 21a serves as a hooking portion in a case where the coaxial connector is inserted or pulled out.

Further, a portion at which bending is required on a root side of the coaxial connector from which the coaxial cable 1 is led out is secondarily molded with a resin such as elastomer or polyvinylchloride, to thereby form a secondary molded part 22 (refer to FIGS. 2C and 2D). In the case of a soft PVC material (polyvinylchloride), a surface hardness is A50 to A100. On a lead-out portion side of the coaxial cable 1, a section over which the secondary molded part 22 overlaps the primary molded part 21 is formed so as to achieve both strength and bendability.

Further, another example of the resin for forming the secondary molded part 22 is a magnetic powder mixed resin obtained by mixing magnetic powder in a synthetic resin. By using the magnetic powder mixed resin, it is possible to increase resistance to noise. An example of the synthetic resin is styrene-based elastomer. Besides, a synthetic resin of olefin-based elastomer, PVC, or the like may be used. An example of the magnetic powder is Ni—Zn-based ferrite. A ratio of iron powder or ferrite powder is set to be equal to or higher than 70% but equal to or lower than 95% in weight ratio to the resin. As the magnetic powder, for example, Ni—Cu—Zn-based ferrite, Mn—Zn-based ferrite, and soft magnetic metal-based, copper-based, magnesium-based, lithium-based, zinc-based, iron-based (for example, permalloy), or cobalt-based magnetic powder can also be used.

Two grooves 21b and 21c are formed in parallel with each other on a surface of the primary molded part 21 in a vicinity of the lead-out side of the coaxial cable 1. The grooves 21b and 21c have an action as a retaining portion. The grooves 21b and 21c each have, for example, a rectangular cross section and extend over a circumference of the surface of the primary molded part 21. Upon secondary molding, the resin for secondary molding enters the grooves 21b and 21c. Consequently, when the coaxial connector is inserted or pulled out, the secondary molded part 22 can be prevented from coming off the primary molded part 21. Further, by providing the grooves 21b and 21c, there is a further advantage that the coaxial cable 1 can be bent more easily.

According to the embodiment of the present technology described above, since only the primary molded part 21 defines an outer diameter P of the coaxial connector, the outer diameter P can be made smaller than conventional coaxial connectors. For example, the outer diameter P can be 13.7+/−0.3 mm. Further, since the plug part 20 can be produced by single time molding, a tolerance can also be reduced in comparison with the case of molding twice, and a coaxial connector having high dimensional accuracy can be implemented. Furthermore, an amount of a molding resin to be used can be reduced, which leads to reduction in environmental load and cost.

It was confirmed as a result of a tensile strength test (pulled for ten seconds by a force of 49 N) that the coaxial connector according to the embodiment of the present technology described above is free from the possibility that the secondary molded part 22 may come off.

Further, it was confirmed as a result of a bending test (test in which the coaxial connector is bent at a rate of 40 times per minute with a weight of 100 g provided that a reciprocation of bending to 90 degrees to the left and the right is regarded as one time) that the coaxial connector stands 500 times.

Figure 3A:
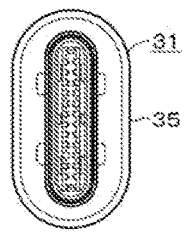
FIGS. 3A, 3B, and 3C are a front elevational view, a horizontal sectional view, and a vertical sectional view, respectively, of a coaxial connector according to another embodiment of the present technology.
Figure 3B:
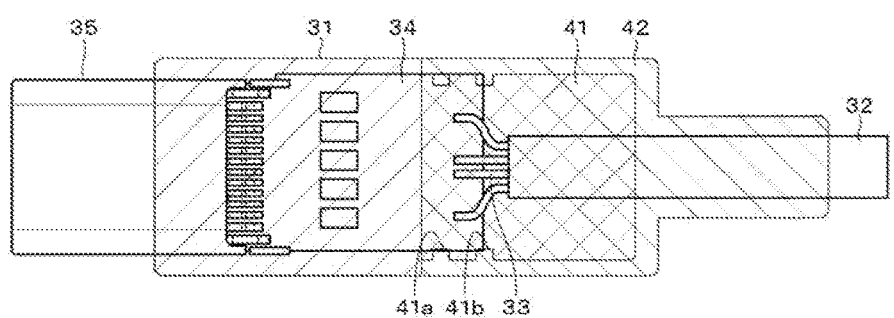
Figure 3C:
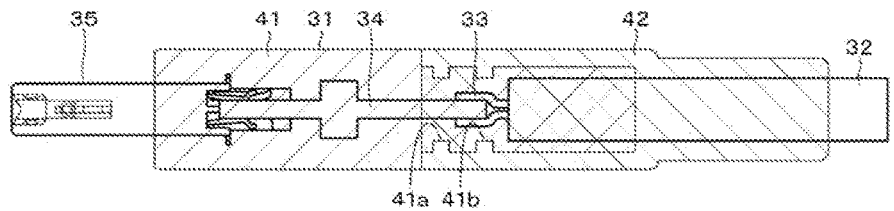
Figure 4A:
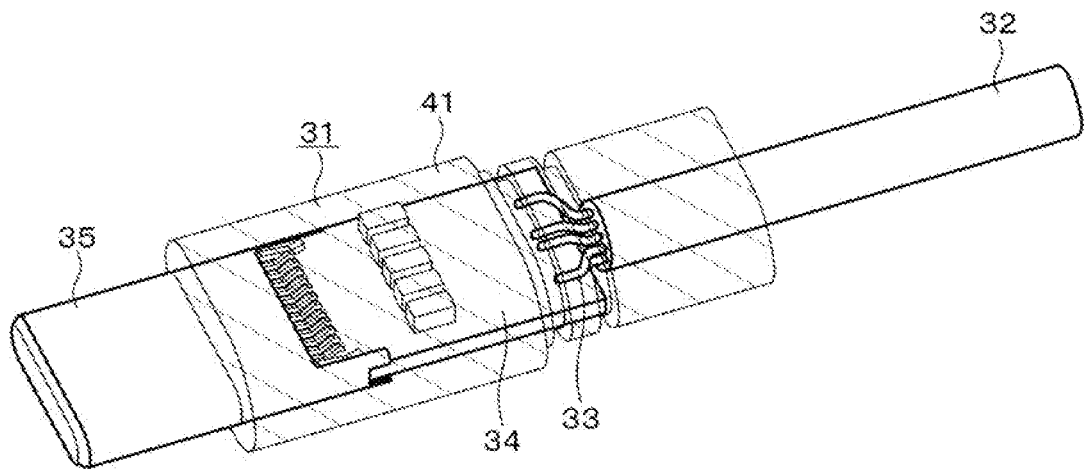
FIGS. 4A and 4B are a perspective view after primary molding and a perspective view after secondary molding, respectively, of the other embodiment of the present technology.
Figure 4B:
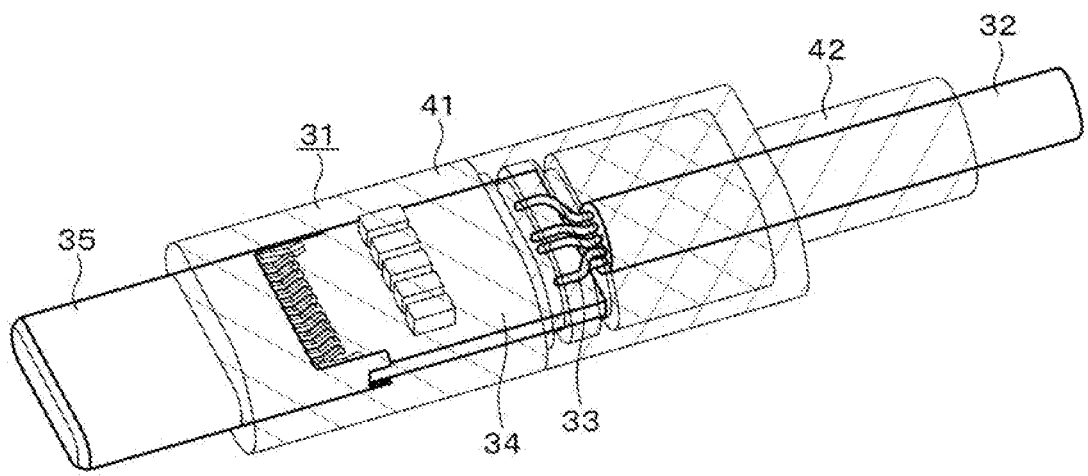

The present technology can be applied not only to the coaxial connector described above but also to other connectors with a cable (a USB (Universal Serial Bus) cable, an HDMI (registered trademark) (High-definition multimedia interface) cable, a power supply cable, and so forth). FIGS. 3A, 3B, and 3C are a front elevational view, a horizontal sectional view, and a vertical sectional view, respectively, of a USB Type-C connector to which the present technology is applied. FIG. 4A is a perspective view of the connector after primary molding, and FIG. 4B is a perspective view of the connector after secondary molding.

The USB Type-C connector is a reversible connector that can be inserted into a receptacle whichever one of a front side or a back face of the connector faces upward, and besides, is a connector that is ready for both power delivery and high speed transmission. The USB Type-C connector has two arrays of pins. One array (A side) and the other array (B side) each have 12 pins. Similarly, also on the side (receptacle) to which a plug is to be inserted, an A side and a B side each have 12 contacts.

In the USB Type-C connector, the pins are assigned in the following manner.

A side
A1: GND: ground
A2: SSTXp1: + side of data transmission prescribed by USB 3.1
A3: SSTXn1: − side of data transmission prescribed by USB 3.1
A4: VBUS: bus power
A5: CC1: configuration channel
A6: Dp1 (or D+): + side of data transmission prescribed by USB 2.0
A7: Dn1 (or D−): − side of data transmission prescribed by USB 2.0
A8: SBU1: side band use
A9: VBUS: bus power
A10: SSRXn2: − side of data transmission prescribed by USB 3.1
A11: SSRXp2: + side of data transmission prescribed by USB 3.1
A12: GND: ground
B side
B12: GND: ground
B11: SSRXp2: + side of data transmission prescribed by USB 3.1
B10: SSRXn2: − side of data transmission prescribed by USB 3.1
B9: VBUS: bus power
B8: SBU2: side band use
B7: Dn2 (or D+): + side of data transmission prescribed by USB 2.0
B6: Dp2 (or D−): − side of data transmission prescribed by USB 2.0
B5: CC2: configuration channel
B4: VBUS: bus power
B3: SSTXn2: − side of data transmission prescribed by USB 3.1
B2: SSTXp2: + side of data transmission prescribed by USB 3.1
B1: GND: ground This connector includes a plug part 31, and a cable 32 is connected to the plug part 31. The cable 32 is a digital signal transmission cable in compliance with the USB Type-C standard described hereinabove and includes a plurality of core wires 33, a shield, an external coating, and so forth. The core wires 33 are each an insulating electric wire in which a conductor is covered with an insulator. The core wires 33 and the shield are connected to a printed circuit board 34 in the plug part 31.

The connector has a metal shell 35 on a front face side of the plug part 31 to be inserted into a receptacle. The metal shell 35 is formed in a tubular shape by stamping a conductive metal plate material into a predetermined shape and bending the metal plate thus stamped. The pins of the A side and the B side described above are provided in an inside of the metal shell 35.

In the connector of another embodiment, primary molding is carried out, for example, with PP so as to include the printed circuit board 34, part of the metal shell 35, the core wires 33 of the cable 33, and connection portions (soldered portions) of electrodes on the printed circuit board 34 as depicted in FIG. 4A. As depicted in FIGS. 3A and 3B, a primary molded part 41 has grooves 41a and 41b formed thereon so as to extend around an outer surface of the primary molded part 41. Further, on a cable lead-out side of the primary molded part 41, the thickness is reduced. In FIGS. 3 and 4, a range of the primary molded part 41 is indicated as a region with slanting lines.

Further, a portion at which bending is required on a root side from which the cable 32 is led out is secondarily molded with a resin such as elastomer or polyvinylchloride, to thereby form a secondary molded part 42. In FIGS. 3 and 4, a range of the secondary molded part 42 is indicated as a region with slanting lines different in inclination from those for the primary molded part 41. The resin for forming the secondary molded part 42 is selected so as to be softer than the resin for forming the primary molded part 41. Further, as the resin for forming the secondary molded part 42, a magnetic powder mixed resin obtained by mixing magnetic powder in a synthetic resin may be used.

At the time of secondary molding, the resin for secondary molding enters the grooves 41a and 41b. This makes it possible to prevent, when the connector is inserted or pulled out, the secondary molded part 42 from coming off the primary molded part 41. Further, in one portion of the primary molded part 41 on the cable lead-out side, a section over which the secondary molded part 42 overlaps is formed. The primary molded part 41 in this section is reduced in thickness, so that the thickness of the plug part 31 becomes substantially uniform, to thereby prevent the thickness from increasing. By providing the section over which the primary molded part 41 and the secondary molded part 42 overlap each other, both bendability and strength can be achieved.

According to the other embodiment of the present technology described above, since only the primary molded part 41 defines the thickness of the USB Type-C connector similarly as in the preceding embodiment, the thickness can be made smaller than conventional connectors. Further, since the plug part 31 can be produced by single time molding, a tolerance can also be reduced in comparison with the case of molding twice, and a USB Type-C connector having high dimensional accuracy can be achieved. Further, an amount of a molding resin to be used can be reduced, which leads to reduction in environmental load and cost.

Although the embodiments of the present technology have specifically been described, the present technology is not restricted to the embodiments described hereinabove, and various modifications based on the technical idea of the present technology are possible. For example, the present technology can be applied to a cable having an outer sheath that includes at least one or more signal lines. Further, the retaining portion for the secondary molded part is not limited to a groove but may be a protrusion. Further, as the resins to be used for primary molding and secondary molding, various resins other than those described hereinabove can be used. Further, the configurations, methods, steps, shapes, materials, numerical values, and so forth given in connection with the embodiments described above are merely examples, and configurations, methods, steps, shapes, materials, numerical values, and so forth different from them may be used as occasion demands.

REFERENCE SIGNS LIST

1 . . . Coaxial cable, 2 . . . Core wire, 4 . . . Shielding wire, 12 . . . Cylindrical receiving portion, 13a . . . Connector end face, 14 . . . Central conductor, 20 . . . Plug part, 21 . . . Primary molded part, 22 . . . Secondary molded part, 31 . . . Plug part, 32 . . . Cable, 33 . . . Core wire, 34 . . . Printed circuit board, 41 . . . Primary molded part, 42 . . . Secondary molded part

The invention claimed is:

1. A connector comprising:
   a cable including at least one core wire and a shielding wire arranged around the core wire with an insulating member interposed therebetween;
   a plug part connected to the cable and capable of fitting with a receptacle;
   a primary molded part including a connection portion between the core wire and a conductive material of the plug part; and
   a secondary molded part arranged at a lead-out portion of the cable to abut an edge of the primary molded part, wherein
   the plug part includes a first outer diameter or thickness of the edge of the primary molded part which is equal to a second outer diameter or thickness of the secondary molded part,
   wherein, during a primary molding process of the primary molded part, a retaining portion is formed over a circumference of a surface of the primary molded part in a vicinity of the lead-out portion of the cable, and a resin for the secondary molded part enters the retaining portion during a secondary molding process of the secondary molded part to increase a strength and bendability of the connector at least on the lead-out portion of the cable.

2. The connector according to claim 1, wherein a section over which the secondary molded part overlaps the primary molded part is formed on a side of the lead-out portion of the cable.

3. The connector according to claim 2, wherein the retaining portion configured to prevent coming-off of the secondary molded part is formed in the section over which the primary molded part and the secondary molded part overlap each other.

4. The connector according to claim 3, wherein the retaining portion includes a recess or a protrusion formed on a surface of the primary molded part.

5. The connector according to claim 1, wherein the secondary molded part is soft in comparison with the primary molded part.

6. The connector according to claim 1, wherein the cable includes a coaxial cable.

7. The connector according to claim 1, wherein the cable includes a digital signal transmission cable.

8. The connector according to claim 1, wherein a printed circuit board is accommodated in the plug part.

9. The connector according to claim 1, wherein the secondary molded part includes a material obtained by mixing magnetic powder with a resin.

10. The connector according to claim 1, wherein the retaining portion includes a plurality of grooves or protrusions.

11. A connector comprising:
    a cable having an outer sheath that includes at least one or more signal lines;
    a plug part connected to the cable and capable of fitting with a receptacle;
    a primary molded part including a connection portion between the signal lines and a conductive material of the plug part; and
    a secondary molded part arranged at a lead-out portion of the cable to abut an edge of the primary molded part, wherein
    the plug part includes a first outer diameter or thickness of the edge of the primary molded part which is equal to a second outer diameter or thickness of the secondary molded part, and
    wherein, during a primary molding process of the primary molded part, a retaining portion is formed over a circumference of a surface of the primary molded part in a vicinity of the lead-out portion of the cable, and a resin for the secondary molded part enters the retaining portion during a secondary molding process of the secondary molded part to increase a strength and bendability of the connector at least on the lead-out portion of the cable.

12. The connector according to claim 11, wherein a section over which the secondary molded part overlaps the primary molded part is formed on a side of the lead-out portion of the cable.

13. The connector according to claim 12, wherein the retaining portion configured to prevent coming-off of the secondary molded part is formed in the section over which the primary molded part and the secondary molded part overlap each other.

14. The connector according to claim 13, wherein the retaining portion includes a recess or a protrusion formed on a surface of the primary molded part.

15. The connector according to claim 11, wherein the secondary molded part is soft in comparison with the primary molded part.

16. The connector according to claim 11, wherein the cable includes a coaxial cable.

17. The connector according to claim 11, wherein the cable includes a digital signal transmission cable.

18. The connector according to claim 11, wherein a printed circuit board is accommodated in the plug part.

19. The connector according to claim 11, wherein the secondary molded part includes a material obtained by mixing magnetic powder with a resin.

* * * * *